Feb. 26, 1929.

E. SCHMIERER 1,703,211

SHREDDER AND MIXER

Filed Feb. 6, 1928

INVENTOR
EUGENE SCHMIERER
BY
George B. Willcox
ATTORNEY

Patented Feb. 26, 1929.

1,703,211

UNITED STATES PATENT OFFICE.

EUGENE SCHMIERER, OF SAGINAW, MICHIGAN, ASSIGNOR TO BAKER PERKINS COMPANY, INC., OF SAGINAW, MICHIGAN, A CORPORATION OF NEW YORK.

SHREDDER AND MIXER.

Application filed February 6, 1928. Serial No. 252,104.

This invention relates to machines for shredding and mixing certain classes of material, such as soda cellulose used in the manufacture of rayon.

In the mixing and shredding of such substances speed and economy of operation can only be attained by an exact placement of the stationary rubbing surfaces with respect to the circle of revolution of the working faces of the revolving beaters.

The particular type of mixer to which my improvement is adapted to be applied consists in a bowl, the bottom of which is in the form of two part-cylindrical troughs arranged side by side with their axes parallel. The middle part of the bottom where the sides of the two troughs meet is in the form of an upwardly projecting ridge or saddle of cusp-shaped cross section. Each of the two troughs has an axially disposed central horizontal shaft on which is mounted one or more revolvable beaters. The outer or working faces of these beaters must rotate with a very small clearance, say, one thirty-second inch from the opposing wall of the saddle, and the clearance should be uniform throughout the entire length and breadth of the wall.

The troughs are usually several feet long, and the machines as built for the kind of service indicated are large and necessarily of massive construction, and consequently securing the right working clearance is a difficult and sometimes very expensive matter.

My improvement, therefore, has to do with the construction of the rubbing faces of the upwardly inclined concave walls of the saddle. These working walls or faces are usually roughened, preferably by having a multitude of pyramidal projections disposed in rows that extend criss-cross the working face, that is to say diagonally, in order that the apexes of pyramids in adjacent rows will not coincide with the circle of revolution of the beater bars but instead will lie at an angle thereto. Their position may be designated, geometrically speaking, by saying that each row defines a short portion of a helix imagined as being described on a surface of revolution.

In my present invention the direction of each pyramid face is altered very slightly, yet its deflection is sufficient to improve the mixing effect of the individual pyramids.

A criss-cross diagonal arrangement of the rows of pyramidal projections has been in use heretofore, but has had serious defects which are overcome in my present improvement.

The saddles have usually been made of cast iron, their curved faces chilled to glasshardness. It is not practicable to mill or cut the diagonally arranged pyramidal rows of projections on the curved faces of a saddle, because the diagonal arrangement of the grooves would require a cutting tool to travel with an eccentric movement for which existing shop tools are not adapted. Consequently the custom heretofore has been to cast these pyramidal projections integral with the saddle, pouring the metal against chills that are very accurately formed. The rubbing faces, however, are long and narrow, and even with the utmost care it is practically impossible to produce a cast saddle having apexes of its pyramidal projections all of the same height, and located in a true but imaginary cylinder of revolution. This is due partly to uneven shrinkage of the saddle casting, partly to the deformation of the chill when heated and partly to slight warping or twisting of the saddle casting when it cools. Sometimes the individual pyramids are of deficient height.

In practice, therefore, the apexes of the cast pyramidal projections, which should have a uniform clearance of about one thirty-second inch from the circle of revolution swept by the working faces of the beater bars actually vary as much as one hundred per cent from that standard. The result is that the effectiveness of the work and the productive capacity of the entire machine are considerably less than they should be.

My present invention overcomes these difficulties in a simple manner and assures that the points of the projections shall be accurately within the desired clearance limits from the surface of revolution of the beater bars. Furthermore, in forming the rubbing face according to my invention the inclined side walls of the individual pyramids are, as I have stated, changed slightly from the direction in which they were originally cut, so that when the rubbing plate is finally shaped the individual pyramid faces do not coincide exactly with the theoretical wall of the diagonal groove between two adjacent rows.

It will be understood that the circle of revolution of the working face of the beaters clears the tips of the pyramids and does not interengage with them.

With the foregoing and certain other objects in view, which will appear later in the specification, my invention comprises the devices described and claimed and the equivalents thereof.

In the drawings Fig. 1 is a part sectional diagrammatic view, showing the lower part of a mixing bowl and the beater arms.

Figure 1:
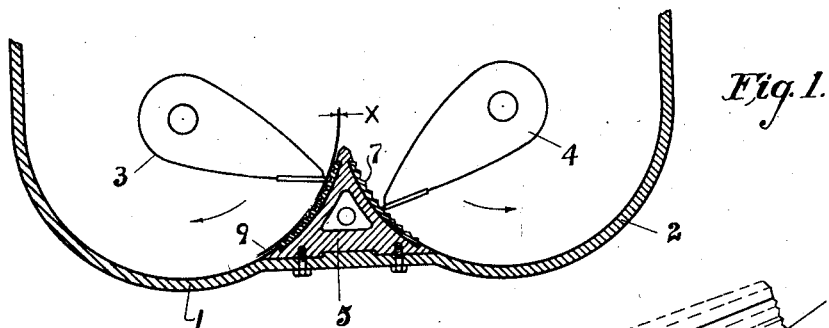
Figure 2:
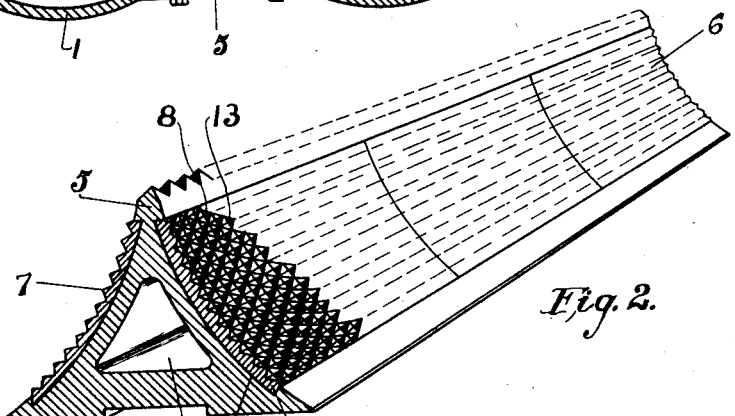
Fig. 2 is a transverse section, showing a saddle embodying my improvement.

In the drawings numerals 1 and 2 designate the part cylindrical troughs of a soda cellulose mixing bowl and 3 and 4 are the beater arms, revolvable as indicated by the arrows.

Between the troughs 1 and 2 is the saddle 5 having concave working faces 6 and 7.

Figure 5:
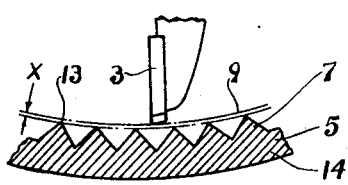
Fig. 5 is a sectional detail of the pyramidal projections.

Heretofore the saddle with its pyramidal projections 8 has been cast in one piece with the working faces chilled as I have already described, but it had the disadvantage that an exact clearance X, Figs. 1 and 5, between the circle of revolution 9 of the beater arm and the tips of the pyramids 8, is variable due to inaccuracies in the casting and distortion of the working face 6 by warping when cooled as previously indicated.

Figure 3:
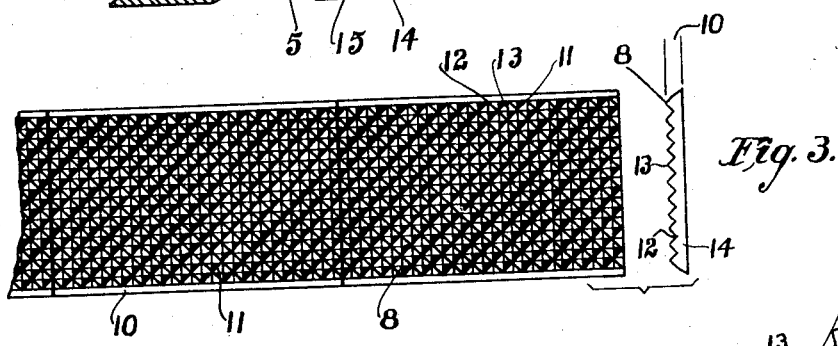
Fig. 3 is a diagrammatic plan view of a saddle plate in the flat.

In my present improvement I take a flat plate 10 of steel or any other suitable metal capable of being hardened, and in it cut diagonal grooves 11 and 12 arranged crisscross, as shown in Fig. 3, to form diagonal rows 13 of accurately machined pyramids, leaving a base or backing plate 14. The backing plate 14 is then bent into accurate cylindric form, as shown in Fig. 4, and is mounted in a suitable recess 15 formed in the curved face of the saddle 5 and secured by peining, welding, or in any other suitable manner, as indicated in Fig. 4.

Figure 4:
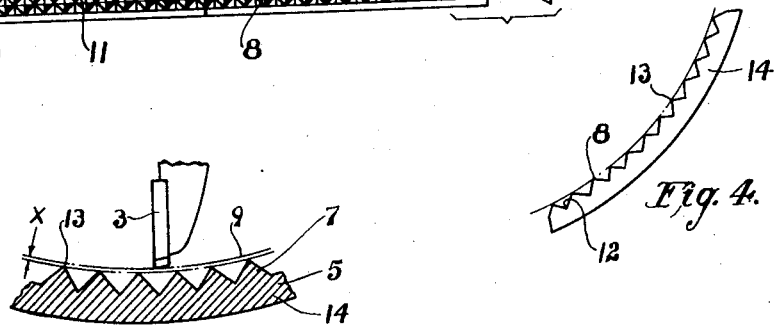
Fig. 4 is an end view of the saddle plate after being curved.

Referring to Fig. 3, it will be seen that the diagonal rows 10 milled along a straight line will each become a portion of a helix when the plate is bent to the shape shown in Fig. 4. It is apparent that the tips of the pyramids will be brought closer together, because they are on a circle of smaller diameter when the plate is curved. Since the pyramids are arranged diagonally on the plate the faces of adjacent pyramids will be thrown out of line slightly with respect to each other when the plate is bent and will have a small, but effective deflecting action on the material being worked, and consequently the effectiveness of mixing will be increased. The principal advantage, however, of this improved construction is that all of the pyramids are exactly the same height and their tips lie in the same imaginary cylinder of revolution, and all of them are equidistant from the circle of revolution of the beaters, represented by the small, but uniform clearance X.

There need be no rejection of expensive saddles 3 on account of small defects in their pyramidal projections, as has heretofore occurred when the projections are cast integral with the saddle, and there is always assurance that the plate will present a true cylindrical rubbing surface, with its pyramids all the same height. Furthermore, there need be no radial or in-and-out adjustment of the working shoes on the blades, because the rubbing surfaces on the saddle are truly cylindrical. In that respect time and expense of erection are saved.

Having thus described my invention, what I claim and desire to secure by Letters Patent is:

1. In a mixing and shredding machine having a pair of troughs the adjacent walls of which define an upwardly projecting saddle of cusp-shaped cross section, revolvable beaters in said troughs, a working face on said saddle consisting of a metal plate having a side thereof formed with cut grooves therein in two parallel series disposed in diagonally criss-cross arrangement, said grooved plate part-cylindric in form and removably secured to said saddle.

2. A working face for the saddle of a mixing machine comprising a metal plate having cut grooves in a side thereof in diagonally criss-cross arrangement, said plate being in part-cylindric form, the side walls of the pyramids defined by said grooves being slightly out of line with respect to each other.

3. The herein described method of making working face plates for the saddles of mixing and shredding machines which consists in cutting into a face of a flat plate accurately spaced parallel grooves arranged in two series disposed criss-cross and bending the flat plate into part-cylindric form with the grooved face inward.

In testimony whereof, I affix my signature.

EUGENE SCHMIERER.